Patented July 2, 1929.

1,719,101

UNITED STATES PATENT OFFICE.

LEON B. CONANT, OF CAMBRIDGE, MASSACHUSETTS, ASSIGNOR, BY MESNE ASSIGNMENTS, TO STANDARD PATENT PROCESS CORPORATION, A CORPORATION OF MASSACHUSETTS.

PROCESS OF VULCANIZING RUBBER TO LEATHER.

No Drawing. Application filed July 2, 1927, Serial No. 203,268, and in Canada July 29, 1926.

This application is a continuation in part of application Ser. No. 114,319, filed June 7, 1926. Previous to my invention, many attempts have been made to vulcanize rubber to leather, but with indifferent success. Some experimenters have thought that by simply rendering the leather anhydrous it thereupon became adapted to the process of hot vulcanization. Others have gone beyond drying the leather, and removed the greases as well. Another experimenter, having freed the leather of all moisture, immediately inclosed it in an envelope in order to keep it anhydrous prior to and during the vulcanization of the rubber composition thereto.

Still another, aware of the presence of moisture in the rubber composition and regarding it as the agent that destroyed the leather when combined in the vulcanizing operation therewith, relied upon a stepped application of pressure to overcome its oxidizing effect upon the leather.

I have repeatedly demonstrated that the above methods are not workable, since they leave the leather, after vulcanization, injured to a degree varying from brittleness to complete ruination that permits a finger touch to dissipate it.

After years of experimentation, I have discovered that the one way whereby rubber and leather can be vulcanized together without injury to the leather is by a pre-heating of the leather at approximately the same temperature as that employed in the vulcanization of the rubber thereto; and then preferably maintaining this acquired pre-heating temperature, assemble it with the rubber composition and introduce both to the heat of vulcanization. In this manner, the pre-heating or heat-energizing of the leather, prior to its introduction to the heat of vulcanization, adapts the leather to accommodate itself readily to the heat of its union with the rubber composition during the hot vulcanization of the latter thereto.

To describe my process more at length, it should be understood as consisting in subjecting the leather to a high temperature, and thereby to provide a pre-vulcanization body heat for the leather that substantially equals that degree which it later acquires during the vulcanization of the rubber composition thereto. Furthermore, it is advisable that this pre-heating be done open to the air, since it injures the leather to close it within an oven, or a vacuum dryer, or the like, because these have the effect of stewing it in its own vapors, thereby rendering it brittle.

Accordingly, having placed the leather on the heated platen of an ordinary hydraulic press, or in any other suitable heater, until it has received the required pre-heating, it becomes both dried out and shrunk, and has its fibres put into a less cohesive condition; but I would emphasize that the mere dryness and shrinkage are incidental. The true purpose of the pre-heating is to provide the leather with a high body-temperature, preferably one approximating that reached in the vulcanization of the rubber composition thereto.

Since this body-temperature is the foundation of my process and is absolutely indispensible thereto, it necessitates that any subsequent handling of the leather, prior to its combination with the rubber composition, shall ensure to the leather most of the body-heat previously acquired. Accordingly, the leather, upon the completion of the pre-heating operation, possesses during the interval of handling immediately preceding the vulcanization of the rubber composition thereto, a degree of body temperature that radiates sufficient heat energy to overcome any opportunity for atmospheric moisture to invade its pores, so that, after becoming adequately heat-energized, the leather is now certain to accommodate itself to the heat of vulcanization.

When, now, the rubber composition and the hot leather are assembled for vulcanization, the high temperature previously acquired and still retained by the leather protects and preserves it for the heat of vulcanization, since the leather is experiencing no substantial change of temperature and has therefore become adapted to receive and accommodate the heat of vulcanization. Therefore, the sulphur fumes and the hot vapor laden with the normal moisture content of the rubber composition which are emitted therefrom following the application of heat and also, preferably pressure thereto, find ready exit through the pores of the leather. It being certain that the pores of the leather should be fully adapted to function as channels to receive and expel a large portion of the vapors emitted from the rubber composition, which can only be secured by the pre-heating operation, it assures that no obstacle remains to oppose the free passage of the vapors emitted from the rubber composition.

Whereas, were the body-heat of the leather substantially less than that of the heat acquired in the vulcanization, the leather, even were it anhydrous and possibly protected by an envelope to prevent the re-absorption of moisture, could not be in a condition to permit the passage of the rubber-vapors, and certain injury would result thereto. The reason this injury occurs when the leather is not pre-heated, is that upon a sudden increase in its temperature there occurs a corresponding expansion of its air-content and, anhydrous or not, the leather cannot discharge its own expanding air-content with sufficient rapidity to clear the way through its pores for the reception and emission of the rubber-vapors, and it is consequently sure to be injured by the oxidizing action thereof.

My process demonstrates that leather, although an unfabricated fibre, is adapted to any ordinary vulcanizing temperature, whether 220° or 360° F.; but there is one indispensable requisite, which is that the leather shall be made to possess prior to its combination with the rubber composition a degree of body-heat substantially to the heat to be absorbed when it is subjected together with the rubber composition to the vulcanizing temperature, in order to withstand the heat of its union with the rubber composition. Accordingly, it is understood that my process of heat-energizing leather to adaptation for the heat of its union with rubber composition during hot vulcanization exacts and requires that the leather become pre-heated or heat-energized at a temperature approximating a hot vulcanizing temperature, and, in particular, that its adaptation exists and obtains, only, when and while so heat-energized.

Having thus pre-heated the leather, the vulcanization is unable to harm it in the least, provided it is subjected thereto while still at the high temperature described; since, having already passed the pre-heating successfully, it follows that vulcanization without a much higher temperature cannot engender any agency capable of destroying the fibres of the leather; and since, further, its pores have been adapted to receive and expel the rubber-vapors.

Inasmuch as leather board is made from leather scrap, my process is equally adapted thereto.

What I claim as my invention is:

1. The process consisting in heating leather to the temperature of hot vulcanization, and, while at substantially the same temperature, uniting and vulcanizing rubber composition thereto.

2. The process consisting in heating leather to approximate the temperature of hot vulcanization, and, while heated, uniting and vulcanizing rubber composition thereto.

3. The process consisting in heating leather to adaptation for the temperature received during hot vulcanization, and while heated, uniting and vulcanizing rubber composition thereto.

4. The process consisting in heating leather to adaptation for the temperature employed in hot vulcanization, and while heat-energized, uniting and vulcanizing with heat and pressure rubber composition thereto.

5. The process consisting in heat-energizing leather to adaptation for the temperature of hot vulcanization and while heat-energized uniting and vulcanizing rubber composition thereto.

6. The process consisting in heat-energizing leather for adaption to the temperature of hot vulcanization and while heat-energized uniting and vulcanizing rubber composition thereto.

In testimony that I claim the foregoing invention, I have hereunto set my hand this 30th day of June, 1927.

LEON B. CONANT.